Figure 1:
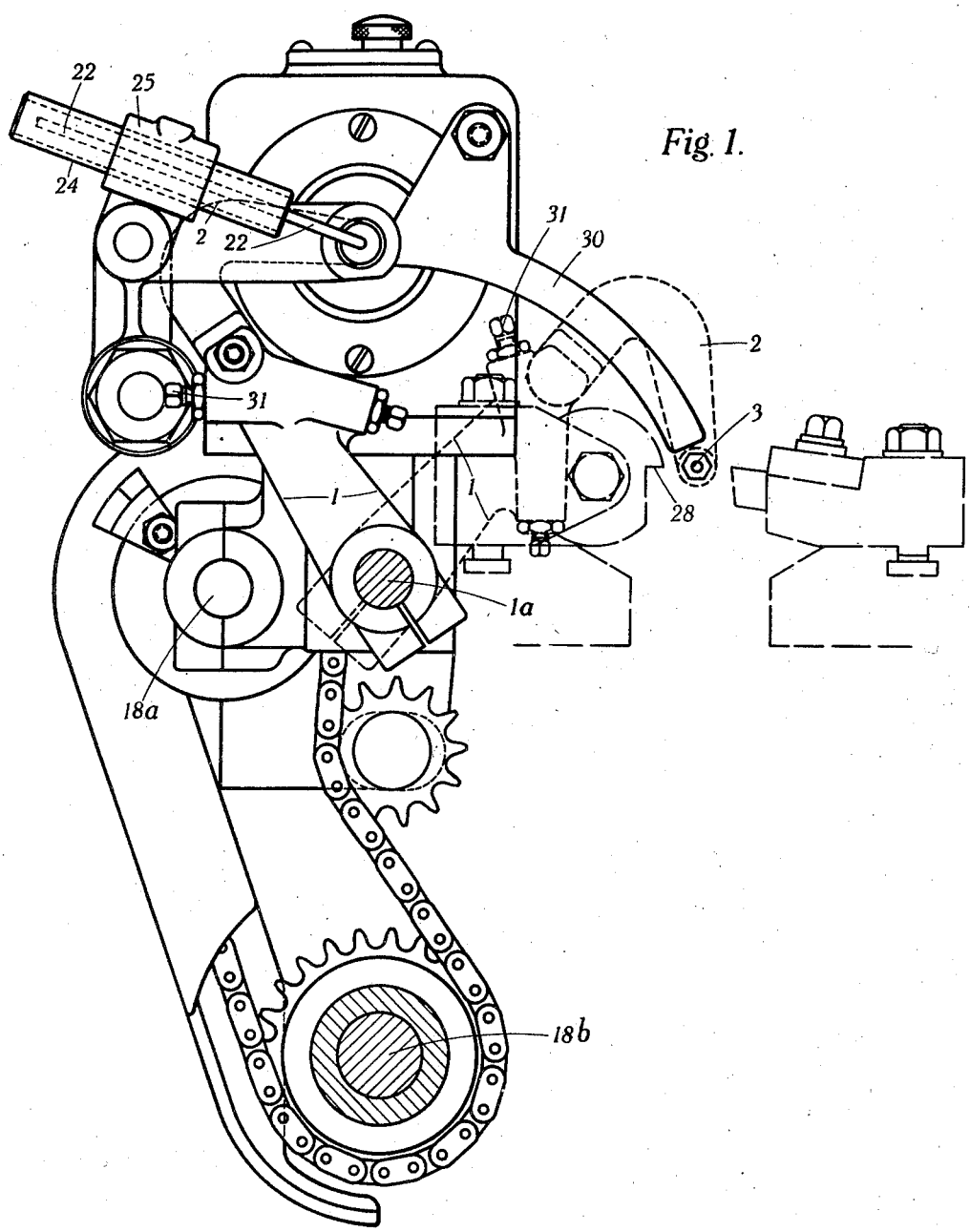

May 14, 1940.  W. OGILVIE  2,201,051
AUTOMATIC LATHE
Filed April 1, 1939   5 Sheets-Sheet 1

Inventor
WILLIAM OGILVIE
by Norris & Bateman
Attorneys

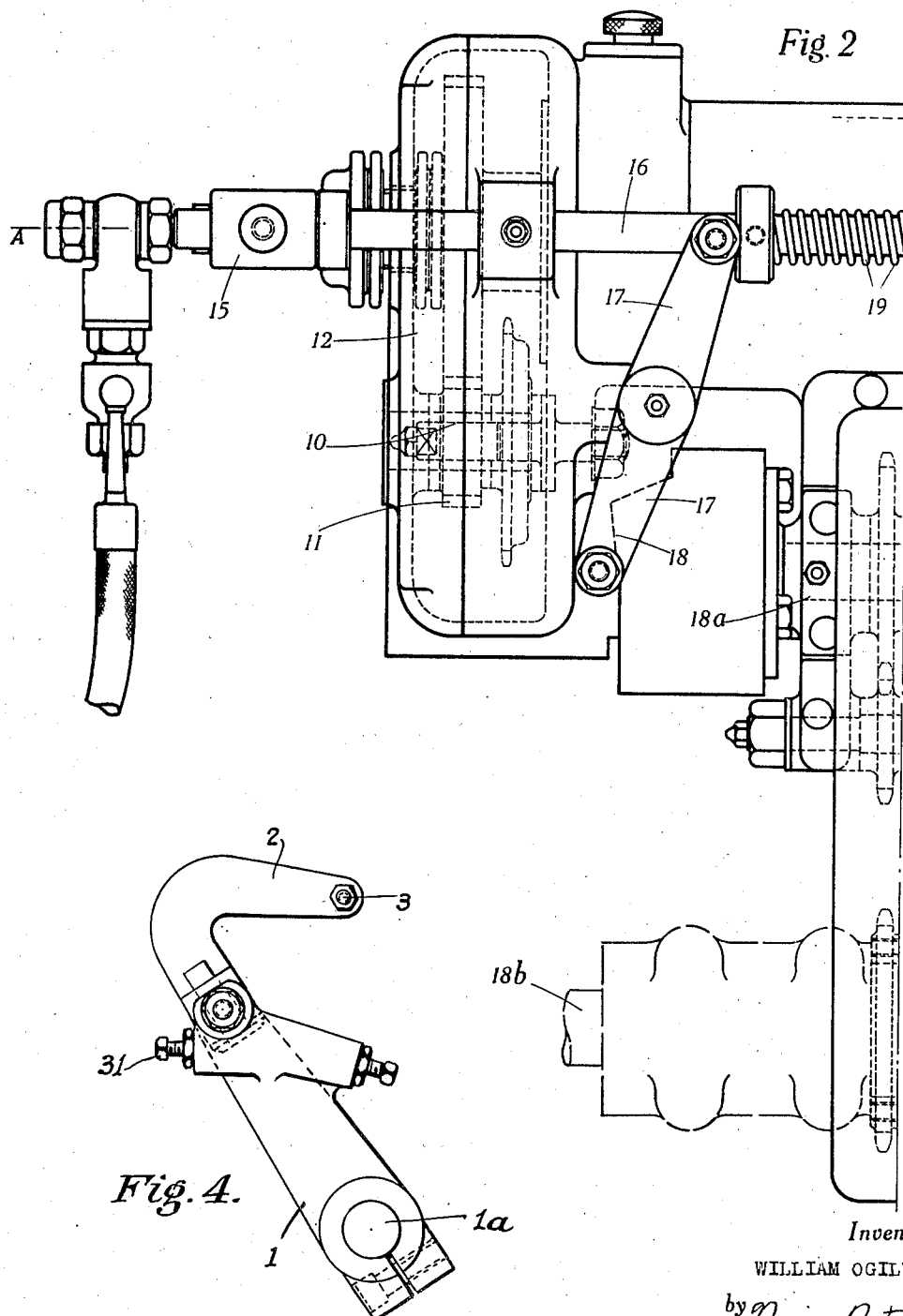

May 14, 1940.  W. OGILVIE  2,201,051
AUTOMATIC LATHE
Filed April 1, 1939  5 Sheets-Sheet 3
Fig. 2A.
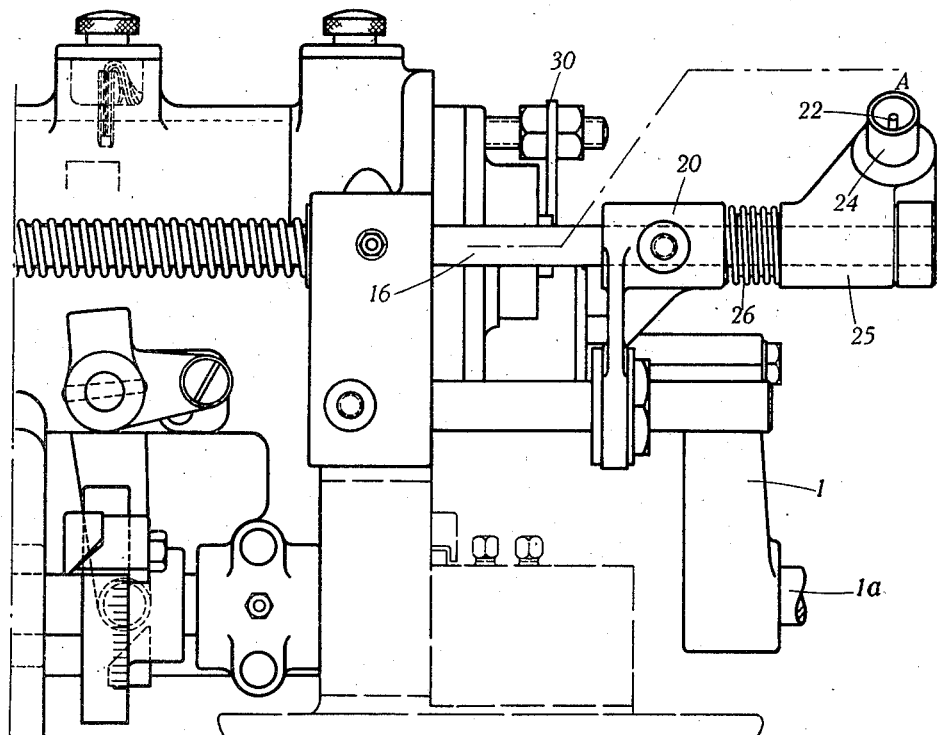
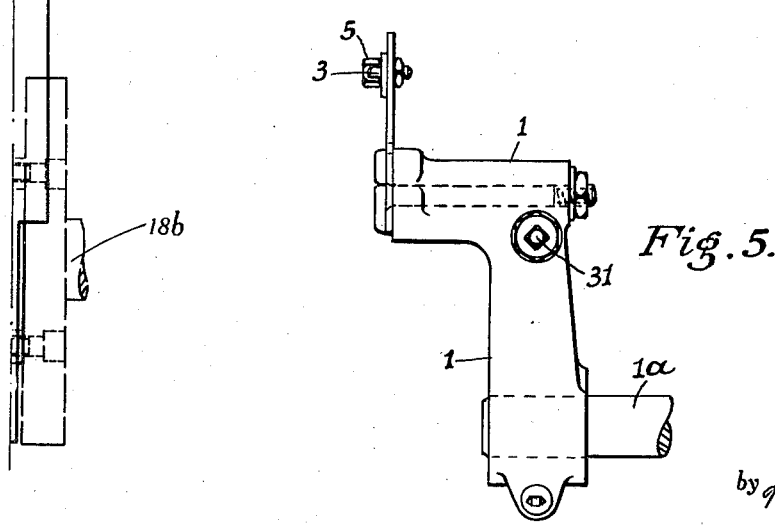
Fig. 5.
Inventor
WILLIAM OGILVIE
by Norris & Bateman
Attorneys

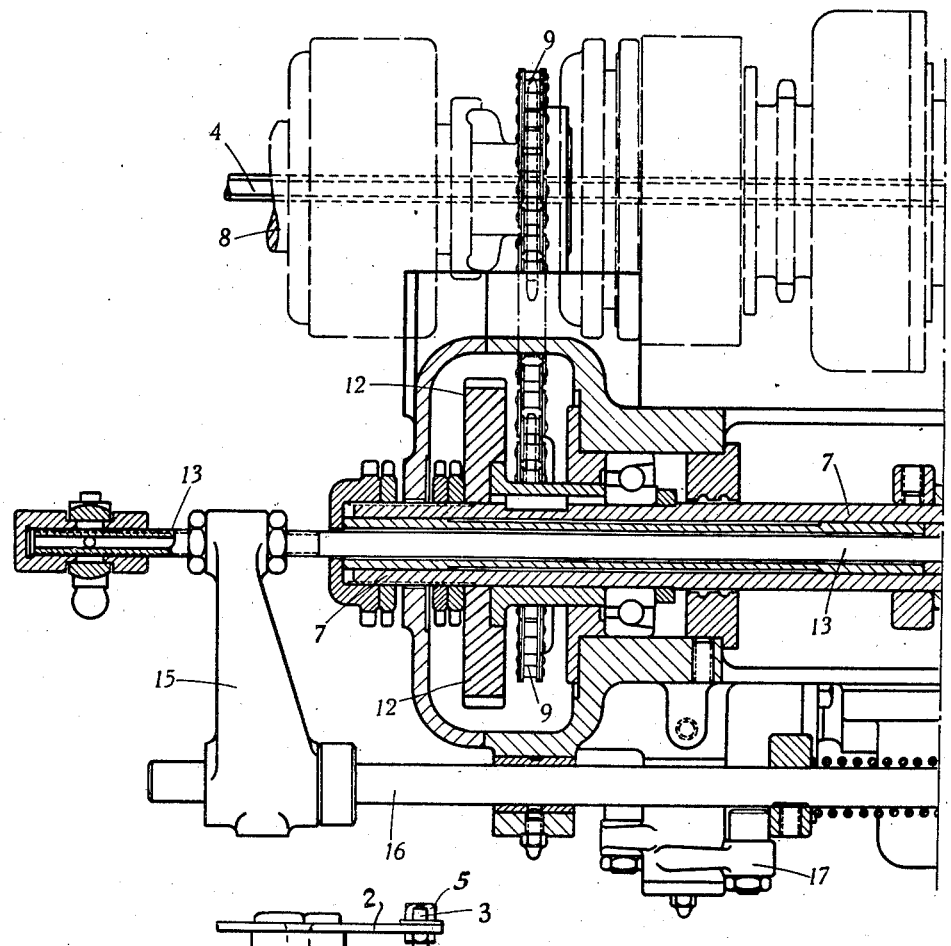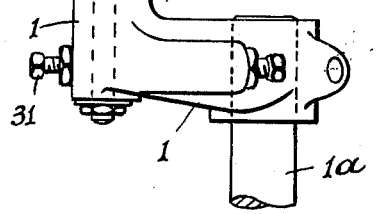

May 14, 1940.          W. OGILVIE          2,201,051
AUTOMATIC LATHE
Filed April 1, 1939          5 Sheets-Sheet 5

Inventor
WILLIAM OGILVIE
by Norrie & Bateman
Attorneys

Patented May 14, 1940

2,201,051

UNITED STATES PATENT OFFICE 2,201,051

AUTOMATIC LATHE

William Ogilvie, Knowle, England, assignor to B. S. A. Tools Limited, Birmingham, England, a British company Application April 1, 1939, Serial No. 265,566
In Great Britain April 2, 1938

4 Claims. (Cl. 29—51)

This invention relates to automatic lathes, and refers more particularly to the kind adapted for use in producing work pieces from bar stock, and wherein the work piece when cut off from the bar stock is carried by a transfer arm to further working positions for subsequent operations thereon to produce the required finished work piece.

In automatic machines of the aforesaid kind, when adapted to produce a work piece such for example as a hexagonal nut from a hexagonal bar stock carried in the head of the main spindle of the machine, it has hitherto been proposed to bore the said bar stock, counter-sink the front end thereof, and part off the work piece from the bar stock carried in the main spindle. The said work piece is then conveyed by a transfer arm to a second working position in which the rear end of the bore is counter-sunk, and is then conveyed by the transfer arm to a third working position in which the bore is screw-threaded by a tapping tool.

The object of the invention is to provide an improved and simplified construction and arrangement of automatic machine in which an operation such as that of counter-sinking of the rear side of the bore, and the tapping of said bore, are adapted to be effected at one and the same working position or station.

According to this invention I provide means whereby the partly formed work piece when cut off from the bar stock, is picked up and transferred to a second working position or station at which two operations are effected on the said work piece, characterized by the provision and use of a chuck or collet carried in a hollow shaft which is adapted to be constantly driven from the main spindle of the machine, said hollow shaft having slidably mounted therein a rod on which is fixed a tool for counter-sinking or other desired operation, said rod being connected at its outer end to one end of a slide bar which is slidably mounted on the machine, said slide bar having mounted on its other end an arm or bracket in which is fixed a screw tap, and means whereby a reciprocating movement is imparted to the said slide bar in order to first bring the counter-sinking or other tool into engagement with the work piece and then retract same and bring the non-rotatable screw tap into operative engagement with the rotating work piece.

In order that the invention may be clearly understood and readily carried into practical effect, I will now describe same with reference to the accompanying drawings, in which:

Figure 1 is an end elevation of an automatic lathe constructed in accordance with and embodying the features of this invention.

Figures 2 and 2ª are views showing collectively a front elevation of the machine.

Figure 3A:
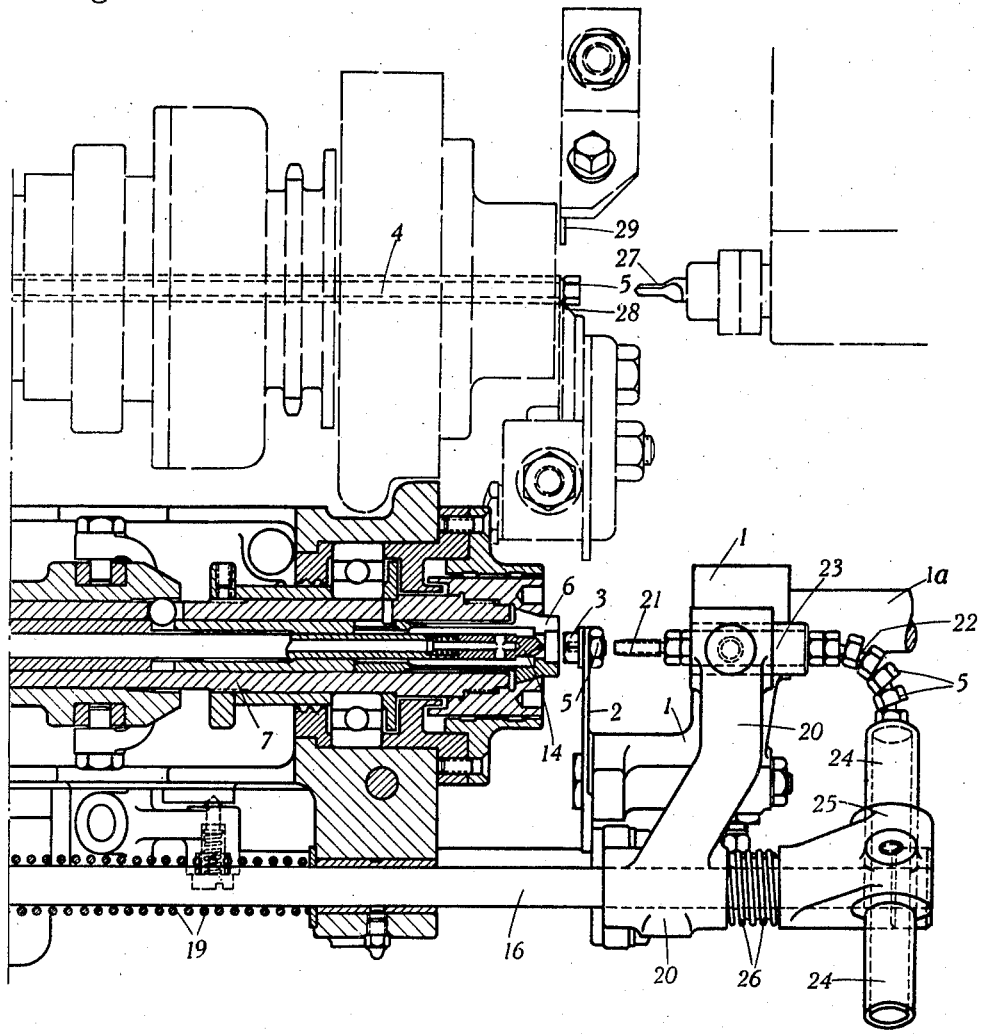

Figures 3 and 3ª are views showing collectively a section of the machine taken on line A—A, Figures 2 and 2ª.

Figures 4, 5 and 6 show respectively an end, a front section and a plan view of the transfer and pickup arm.

According to one convenient mode of carrying the invention into effect, as illustrated, I provide a transfer arm 1 which is adapted to have imparted thereto by known means a combined rocking and reciprocating movement, the said transfer arm 1 having fitted to the outer end thereof a pick-up arm 2 on which is fitted a peg or projection 3, arranged to engage with the bore formed in the end of the bar stock 4 on the inward part of the reciprocating movement of the transfer arm 1. When the partly formed nut or other kind of work piece 5 is cut off from the bar stock 4, the transfer arm 1 and the pick-up arm 2 thereon are caused to move outward and then rocked to the second working position or station, which latter comprises a chuck or collet 6 mounted in a hollow shaft 7 adapted to be constantly driven from the main spindle 8 of the machine, which in one convenient arrangement may be effected by chain transmission 9 to a countershaft 10 on which is mounted a pinion 11 arranged to engage with a pinion 12 on the aforesaid hollow shaft 7, the said arrangement being adapted to provide ready means for a change of gear ratio when so desired. Means are provided for opening and closing the chuck 6 to receive the work piece 5 and then grip same during the operations thereon as hereafter described.

Within the aforesaid hollow shaft 7 is mounted a rod 13 having fitted to its front end a counter-sinking or other suitable tool 14 as may be required, and to the protruding rear end of the said tool carrying rod 13 is connected an arm or bracket 15 which is fixed on a longitudinally movable or reciprocating slide bar 16, the said slide bar being adapted to be moved in one direction by a rocking lever 17 actuated by a cam 18, and in the other direction by means of a spring 19. The aforesaid cam 18 is mounted on an auxiliary cam shaft 18a which in one convenient arrangement is driven from the main cam shaft 18b by chain or other suitable transmission means.

Near the front end of the aforesaid reciprocating slide bar 16 is mounted an arm or bracket 20 arranged to carry a fixed or non-rotatable screw tap 21 having a stem 22 of curved formation over which the work pieces 5 pass after being screw-threaded. In one convenient arrangement, the mounting of the screw tap 21 on the bracket 20 of the slide bar 16 is effected by forming in the end of said bracket a hole 23 in which is located the stem of the screw tap, said hole being of a diameter adapted to permit of the work pieces 5 slidably passing therethrough and at the same time provide a lateral support for the screw tap. The end of the stem 22 of the screw tap 21 is curved and bent at right angles and arranged to enter a horizontally disposed guide tube 24 adapted to slidably receive the work pieces 5 and also constitute a longitudinal support for the screw tap 21, and further provides an outlet for the finished work pieces.

The aforesaid horizontal guide tube 24 is preferably mounted in a lug or bracket 25 which is slidably carried on the end of the slide bar 16 which carries the bracket 20 in which the front part of the screw tap 21 is mounted, a spring 26 being located between the aforesaid brackets 20 and 25, and adapted to permit of a slight longitudinal movement of the screw tap 21 in the bracket 20 mounted on the slide bar 16, so that when the screw tap 21 engages with the work piece 5, it is permitted to have a slight longitudinal movement relative to the slide bar 16 on which it is carried.

The mode of operation is as follows:

The work piece 5, which for example may be a hexagonal nut produced from a hexagonal bar 4 carried in the main spindle 8 of the machine, is in known manner first bored by the tool 27 and counter-sunk on its outer face by the tool 28, as shown in dotted lines in Figures 1 and 3. The transfer arm 1 then moves inward so that the peg or projection 3 on the pick-up arm 2 enters the bore in the partly formed work piece 5, which is then parted off from the bar stock 4 by the tool 29, and said transfer arm 1 is then rocked by the shaft 1a from the position shown in broken lines in Figure 1 to bring the work piece 5 to the next working position or station opposite to the constantly driven secondary shaft 7 in which is mounted the chuck or collet 6. During the aforesaid rocking movement the work piece 5 is arranged to slide over the face of a curved guide plate 30, as seen in Figure 1, which is intended to prevent displacement of the work piece from the peg 3 on the pick-up arm 2, and rocking movement of the transfer arm 1 is limited by engagement of same with a suitable adjustable stop 31. When the work piece 5 is in axial alignment with the chuck or collet 6 in the secondary shaft 7 the said chuck is opened and the pick-up and transfer arms 1 and 2 are then moved inward to bring the work piece 5 within the jaws of the chuck. The chuck 6 is then closed and the pick-up and transfer arms 1 and 2 are moved outward and again rocked to their original or normal position, as shown in broken lines, the aforesaid movements being effected by any convenient or known arrangement of cam actuated lever or like mechanism not shown in the drawings. The longitudinally slidable bar 16 which carries at one end the bracket 20 in which is mounted the screw tap 21, and is connected at its other end to the rod 13 slidably mounted in the secondary shaft 7 and having fixed thereto a counter-sinking or other tool 14, is then moved by the cam actuated lever 17 which brings the said tool 14 into operative contact with the rear face of the work piece 5. The aforesaid cam actuated mechanism in conjunction with the spring 19 which is conveniently mounted on the aforesaid slide bar 16, now causes the latter to be moved in an opposite direction, thus retracting the counter-sinking tool 14, and simultaneously bringing the screw tap 21 into engagement with the bore in the work piece located in the chuck 6 in the constantly revolving secondary shaft 7. When the screw tap 21 has passed through the work piece the chuck 6 is opened, and the slide bar 16 is then moved by the cam actuated lever 17 to an outward position, ready for the next cycle of operations, and the finished work piece has been moved on to the stem part 22 of the screw tap 21, having pushed along said stem the previously finished work pieces, which in the manner as previously described are arranged to constitute a lateral and a longitudinal support for the said fixed or non-rotating screw tap.

When setting up the machine in the first instance, the curved stem 22 of the screw tap 21 is in known manner loaded with suitable blanks adapted to provide the necessary support for the screw tap, until the requisite number of finished work pieces have beeen produced and moved into the position occupied by the said blanks.

Having described my invention, what I claim is:

1. In an automatic lathe of the kind herein specified, the combination with a rocking and reciprocating arm operative to pick up and transfer a partly formed work piece from a first to a second working station, of means for effecting two operations at said second station, comprising a rotatable hollow shaft carrying means for holding a work piece, a rod slidably mounted in said hollow shaft, a tool carried on one end of said rod and adapted to operate on the work piece held by said hollow shaft from the rear side of said work piece, a slide bar mounted on the lathe and having a bracket thereon connected to one end of said tool carrying rod, a screw tap mounted non-rotatably on the other end of said slide bar and arranged to operate on the work piece from the front side thereof, and means for reciprocating said slide bar to bring said tool into operative engagement with the rear part of the work piece held by said hollow shaft, retract said tool from said work piece, and then bring the non-rotatable screw tap into operative engagement with the work piece held by said hollow shaft.

2. An automatic lathe according to claim 1, wherein the means for imparting a reciprocating movement to said slide bar comprises a spring operative to move the said bar in one direction to bring said screw tap into engagement with the bore in the work piece held by said hollow shaft, and a cam-operated rocking lever operative to move said bar in the opposite direction to bring said tool into operative engagement with the rear side of said work piece.

3. An automatic lathe according to claim 1, wherein the means for mounting said screw tap on the end of said slide bar comprises a bracket fixed to said slide bar and having a hole formed therein, said screw tap having a longitudinal stem which is located in said hole and a portion of which is bent at an angle, said hole being of a diameter which permits passage therethrough of the work pieces and also provides lateral support for the said screw tap, and a laterally disposed guide tube mounted on said slide bar and having located therein the portion of the stem of said screw tap which is bent at an angle, said tube being arranged to slidably receive the work pieces and to also constitute a longitudinal support for the screw tap.

4. An automatic lathe according to claim 1, wherein the means for mounting said screw tap on the end of said slide bar comprises a bracket fixed to said slide bar and having a hole formed therein, said screw tap having a longitudinal stem which is located in said hole and a portion of which is bent at an angle, said hole being of a diameter which permits passage therethrough of the work pieces and also provides lateral support for the said screw tap, a horizontally disposed guide tube having the bent portion of the stem of said screw tap located therein, a bracket slidably carried on the said slide bar and supporting said guide tube thereon, and a spring interposed between said bracket and slide bar and yieldable to permit longitudinal movement of said guide tube and screw tap relatively to said slide bar.

WILLIAM OGILVIE.